United States Patent
Bachmann et al.

(10) Patent No.: US 11,254,785 B2
(45) Date of Patent: Feb. 22, 2022

(54) PROCESS FOR PREPARING POLYESTERS BY USING AN ADDITIVE

(71) Applicant: TECHNIP ZIMMER GMBH, Frankfurt am Main (DE)

(72) Inventors: Holger Bachmann, Weiterstadt (DE); Rainer Linke, Butzbach (DE); Eckhard Seidel, Frankfurt am Main (DE); Michael Reisen, Frankfurt am Main (DE); Reza Sarbandi, Frankfurt am Main (DE)

(73) Assignee: TECHNIP ZIMMER GMBH, Frankfurt (DE)

( * ) Notice: Subject to any disclaimer, the term of this patent is extended or adjusted under 35 U.S.C. 154(b) by 45 days.

(21) Appl. No.: 16/622,738

(22) PCT Filed: Jul. 6, 2017

(86) PCT No.: PCT/EP2017/067033
§ 371 (c)(1),
(2) Date: Dec. 13, 2019

(87) PCT Pub. No.: WO2019/007522
PCT Pub. Date: Jan. 10, 2019

(65) Prior Publication Data
US 2020/0102421 A1    Apr. 2, 2020

(51) Int. Cl.
*C08G 63/78* (2006.01)
*C08G 63/183* (2006.01)

(52) U.S. Cl.
CPC .......... *C08G 63/78* (2013.01); *C08G 63/183* (2013.01)

(58) Field of Classification Search
USPC ........................................ 528/271, 272, 274
See application file for complete search history.

(56) References Cited

U.S. PATENT DOCUMENTS

| | | |
|---|---|---|
| 4,147,737 A | 4/1979 | Sein et al. |
| 4,234,707 A | 11/1980 | Rody et al. |
| 4,361,681 A | 11/1982 | Bernhardt |
| 4,910,287 A | 3/1990 | McLafferty et al. |
| 5,700,860 A * | 12/1997 | Nishikawa ........ G02F 1/133723 430/20 |
| 6,342,578 B1 | 1/2002 | Huang |
| 2008/0236443 A1 | 10/2008 | Salsman |
| 2013/0261222 A1 | 10/2013 | Schiraldi et al. |

FOREIGN PATENT DOCUMENTS

| | | |
|---|---|---|
| EP | 2 268 702 B1 | 11/2012 |
| EP | 2 881 415 A1 | 6/2015 |
| GN | 1483054 | 3/2004 |
| JP | 54-090292 | 7/1979 |
| JP | 57-105450 | 6/1982 |
| JP | 06-157736 | 6/1994 |
| JP | H09157373 A | 6/1997 |
| JP | 2000-311516 | 11/2000 |
| WO | 02/46265 | 6/2002 |

OTHER PUBLICATIONS

Jiao Jian et al., An overview on synthesis, properties and applications of poly(butylene-adipate-co-terephthalate)—PBAT; Advanced Industrial and Engineering Polymer Research; vol. 3, Issue 1, Jan. 2020, pp. 19-26 (Year: 2020).*
ISA/EP—Written Opinion of the International Search Authority—International Application No. PCT/EP2017/067033.
Devroede, J., Duchateau, R., Koning, C.E., and Meuldijk, J.—"The synthesis of poly(butylene terephthalate) from terephthalic acid, part I: The influence of terephthalic acid on the tetrahydrofuran formation."—Journal of Applied Polymer Science—Jul. 9, 2009—vol. 114, 2435-2444 (2009)—Wiley Periodicals, Inc.
Indian Patent Office—Examination Report dated Jun. 4, 2021 (Indian Patent Application No. 202047000101).
Korean Office Action dated Jun. 18, 2021—Korean Patent Application No. 10-2019-7036603.
Japanese Office Action dated Apr. 5, 2021—Japanese Patent Application No. 2019-572759.
Chinese Office Action dated Sep. 28, 2021—Chinese Patent Application No. 2017800929382.

* cited by examiner

*Primary Examiner* — Terressa Boykin
(74) *Attorney, Agent, or Firm* — Lott & Fischer, P.L.

(57) ABSTRACT

A process for reducing the amount of hydroxyl-end-groups of a polyester, wherein the polyester is prepared from at least one dicarboxylic acid and at least one dihydroxy alcohol, and at least one additive selected from the group consisting of carboxylic acid anhydride and mono-isocyanate, and wherein the additive is added during a step of prepolycondensation and/or during a step of polycondensation and/or after a step of polycondensation.

16 Claims, No Drawings

PROCESS FOR PREPARING POLYESTERS BY USING AN ADDITIVE

This application is a national phase of PCT Application No. PCT/EP2017/067033 filed Jul. 6, 2017, the contents of which are hereby incorporated by reference.

The present invention relates to a process for preparing polyesters, wherein in this process a specific additive is added. Furthermore, the present invention relates to the use of these additives in such a process.

The prior art describes many processes for the preparation of polyesters, polybutylene-adipate-terephthalate polyester (PBAT), polybutylene-succinate (PBS) and polybutylene-terephthalate polyester (PBT). Generally, the respective dicarboxylic acid is reacted with the diol compound.

The obtained polyesters do often not fulfill certain requirements. For example, the color qualities should be improved. Further, the process should be carried out faster, the amount of tetrahydrofuran (THF) should be reduced, the amount of required diol should be reduced as well. Moreover, products are required which show a lower decomposition in the melt phase, and a better controllable build-up in the melt phase is desired.

From the prior art, for example WO96/15173, EP 2 268 702, EP 2 628 758, WO 2014/067954, and CN 102443149) various processes for preparing polyesters are known, wherein in these processes dicarboxylic acid anhydrides and/or mono-isocyanates are used.

In these processes, the dicarboxylic acid anhydrides and eventually di-isocyanates are used as monomers to build-up the polyester. These compounds are not used as additives added to the process for preparing polyesters in order to reduce the corresponding hydroxyl-end-groups for example expressed by the hydroxyl-end-group to carboxyl-end-groups ratio.

Therefore, the technical problem underlying the present invention is to provide a process for preparing polyesters, wherein the color qualities are improved, the process is carried out faster, the amount of tetrahydrofuran (THF) is reduced, the amount of required diol is reduced, and lower decomposition in the melt phase and a more controllable build-up in the melt phase is achieved.

This objective is solved by a process for reducing the amount of hydroxyl-end-groups of polyesters, wherein
the polyester is prepared from at least one or more dicarboxylic acids and at least one or more di-hydroxy alcohols, and
at least one additive selected from the group of carboxylic acid anhydrides and/or mono-isocyanate. As carboxylic acid anhydrides mono- and/or dicarboxylic acid anhydrides can be used.

The term "reducing the hydroxyl-end-groups of the polyester" means that the amount of hydroxyl-end-groups of the polyester prepared by using the additive is less compared to the polyester prepared without the additive. The reduced amount of hydroxyl-end-groups can be put into relationship with the amount of the carboxyl-end-groups, for example expressed as the difference of the hydroxyl-end-groups and the carboxyl-end-groups or as ratio of hydroxyl-end-groups and carboxyl-end-groups.

The carboxylic acid anhydride can have 2 to 16 carbon atoms. The mono-isocyanate can have 2 to 10 carbon atoms.

The carboxylic acid anhydride used as additive can have the same or a different basic hydrocarbon structure compared to the dicarboxylic acid used as monomer.

In one embodiment of the process for preparing the polyester according to the present invention, the carboxylic acid anhydride is preferably selected from the group consisting of glutaric acid anhydride, acetic acid anhydride and succinic acid anhydride. Furthermore, the mono-isocyanate can be phenyl-isocyanate.

In one embodiment, the additive can be added in an amount of 0.1 to 10.0 wt. %, in particular about 0.2-1.0 wt. %, in relation to the final polyester.

By the method according to the present invention it is possible to reduce the ratio of hydroxyl-end-groups (OH-end-groups) to carboxyl-end-groups (COOH-end-groups) by reaction of the dicarboxylic acid anhydride and/or mono-isocyanate in particular added during prepolycondensation and/or polycondensation or after polycondensation wherein an improvement in color and stability, and a reduction of byproducts as tetrahydrofuran (THF) e.g. for products with 1,4-butanediole (BDO) as monomer are achieved.

For PBAT and PBS, dicarboxylic acid anhydrides are already known as monomers, being not effective as additional OH-end-groups reducers. In contrast thereto, according to the present invention the additive added later to the process (e.g. during or after polycondensation) is suitable to reduce the OH-end-groups.

All recipes for polyesters, in particular PBAT, PBS, or PBT can be used but also other polycondensates and copolyesters based on acids and diols with and without different co-monomers can be prepared with the process according to the present invention.

All the process steps and operation parameters are known to the skilled person.

For example, the following process parameters and in particular the process parameters described in the following examples can be used, wherein it is pointed out that the single process parameters are not inextractably linked with the other parameters so that the process according to the present invention can be carried out if one of the specifically parameters is singled out and combined with other parameters.

The process of the present invention can be carried out for discontinuous and continuous production of polyesters.

In the following, the components used in the process for preparing the polyesters are described.

Examples of the aliphatic dicarboxylic acids are linear acids having a molecular formula $C_nH_{2(n-1)}O_4$ with n equal to or smaller 40 such as oxalic-, malonic-, succinic-, glutaric-, adipinic-, or pimelic-acid, but also dimeric acids or dicarboxylic acids having a cyclic ring as cyclohexane dicarboxylic acid. Also the (in particular methyl-, ethyl-, propyl- or butylic) ester of these acids as well as the acid anhydrides (e.g. succinic acid anhydride) can be employed. These acids can be used as single compound or as mixture of two or more compounds.

As aromatic acids can be used e.g. terephthalic acid, isophthalic acid, 2,6-naphtalenedicarboxylic acid but also acids having a furan ring e.g. furandicarboxylic acid as well as their respective (in particular methyl-, ethyl-, propyl- or butylic) ester. These acids can be used as single compound or as a mixture of two or more compounds.

As diol aliphatic or alicyclic compounds having two —OH groups can be used. Preferred are aliphatic diols with 2-10 carbon atoms, e.g. ethyleneglycol, 1,3-propanediol, 1,4-butanediol, neopentylglycol, 1,6-hexamethyleneglycol or 1,4-cyclohexanedimethanol, polyglycols based on ethylene glycol or trimethyleneglycol or 1,4-butanediol and polytetrahydrofurane (polytetramethylene ether glycols). These diols can be used either single or as a mixture of two or more diols.

Catalysts can be used in both steps of the method according to the present invention. As catalyst known metals and organometallic compounds can be used. Preferred are titanium catalysts or organometallic titanium compounds (e.g. tetrabutyl-titanate).

To improve the elastic properties of the polymer polyols as e.g. polyethylene glycol, polypropylene glycol or polytetramethylene ether glycol having a molecular weight of 250-4000 g/mol can be added in a concentration of 0.01-40 mol-% (in particular 0.01-5 mol %) based on the total amount of acids and diols.

To improve or modify mechanical properties of the obtained polyester, a branching agent can be used. Examples are a tri- or higher valent alcohols (e.g. glycerol, pentaerythrit) or an appropriate trivalent acid (e.g. propane-1,2,3-tricarboxylic acid) and/or acid anhydrides (e.g. trimellitic acid anhydride) or a tri- or higher valent oxocarboxylic acid (like malic acid, citric acid, hydroxyisophthalic acid).

In the method according to the present invention, a stabilizer can be employed. As stabilizer a phosphorous compound can be used. Examples are phosphoric acid ($H_3PO_4$), triethylphosphonoacetate (TEPA), tris-tri-ethylene glycol phosphoric acid (TEGPA) or 3-phosphonopropionic acid (CEPA).

A biodegradable PBAT made from butanediol, terephthalic acid and adipic acid can be carried out according to the following recipe:
(a) monomers: 1,4-butanediol (BDO), terephthalatic acid (PTA), adipic acid (ADA);
(b) a polyol to improve the elastic properties as polyethylene glycol or polytetramethylene ether glycol having a molecular weight of 250-4000 g per kg PBAT;
(c) a branching agent as pentaerythritol or glycerol, 0.01-50 g per kg PBAT; phosphorous compound as stabilizer like triethylphosphonoacetate (TEPA), tris-tri-ethylene glycol phosphoric acid (TEGPA), phosphoric acid ($H_3PO_4$) each in an amount of 5 to 200 ppm P;
(d) a catalyst for esterification and polycondensation reaction, which can be chosen from different types or the same;
(e) the above mentioned additives to reduce the amount of the OH-end-groups, in particular glutaric acid anhydride, acetic acid anhydride, succininic acid anhydride or phenyl-isocyanate; and
(f) optional hexamethylene di-isocyanate or another chain extender to increase the chain length and decrease the end-groups in addition.

In one embodiment, the process for preparing the polyester can comprise the steps (trans-)esterification, prepolycondensation and polycondensation. These are usual steps employed in the preparation of polyesters so that the skilled person knows how they are carried out. In particular, the additive can be added during the step of prepolycondensation and/or polycondensation and/or after polycondensation.

Furthermore, the present invention relates to the use of the above mentioned additives selected from the group consisting of carboxylic acid anhydrid or mono-isocyanate for reducing the amount of the hydroxyl-end-groups in polyesters.

With the process according to the present invention and the use according to the present invention, several advantages are achieved. The obtained polyesters do fulfill certain requirements. For example, the color qualities are improved. The process is carried out faster, the amount of tetrahydrofurane (THF) is reduced, the amount of required diol is reduced as well. Further products are obtained which show a lower decomposition in the melt phase, and a more controllable build-up in the melt phase is achieved.

The invention is illustrated by the following examples which shall not be construed as restricting the invention thereto.

EXAMPLE 1 AND COMPARATIVE EXAMPLE 1

A 10 l autoclave was used for the reaction steps from the beginning to the end.
The following Example 1 was carried out.
Esterification:
Recipe:
1385.1 terephthalic acid (PTA)
1089.4 g butanediol (BDO, molar ratio 1:1.45)
1460 g Hombifast HS-06 (60 ppm Ti related to final polymer)
47.4 g polyethylene glycol 400 (PEG 400, 13 kg/to)
2.55 g pentaerythritol (0.7 kg/to)
Esterification of PTA
The monomers and the catalyst were put into the reactor and stirred continuously. After rendering inert, the reactor was heated. When the product temperature reached 195° C. (start of time measurement), the pressure was reduced within 15 minutes to 400 mbar while the product temperature increased further to 240° C. Esterification was finished after 120 minutes.
Preparation of Adipic Acid Solution in BDO
Recipe:
1319.5 g adipic acid (ADA)
789.3 g BDO (molar ratio 1.00)
BDO was filled into a vessel and afterwards adipic acid was added. The vessel was rendered inert by nitrogen. The mixture was heated up to 160° C. under slight overpressure and stirred until the PTA esterification was finished. During this time, the adipic acid dissolved in BDO.
Continuation of Esterification:
The adipic acid-BDO-solution was fed into the esterification reactor within approximately 5 minutes. The product temperature, as a result of the feed and the set down of the heating temperature, dropped to 190° C. and increased in the ongoing esterification to 212° C. The condensate yield indicated the target end of the esterification reaction after a total of 160 minutes after start of time measurement.
Prepolycondensation:
The condensing system was switched from esterification condenser to prepolycondensation cooling traps and the pressure was reduced to 150 mbar within 5 minutes and further to 35 mbar within 5 minutes. This target pressure was kept constant for 10 minutes. The melt temperature averaged at 235° C. The overall prepolycondensation time was 20 minutes.
Addition of Polycondensation Catalyst:
An amount of 2.07 g Tyzor TnBT catalyst (Dorf Ketal, 80 ppm Ti related to the final polymer) was fed afterwards and -flashed down with 10 g BDO in the reactor.
Polycondensation:
The condensing system was switched from prepolycondensation cooling traps to polycondensation cooling traps. The pressure was reduced within 15 minutes to <1 mbar. The temperature during the polycondensation was 240° C.
After a polycondensation time of 190 minutes 20 g succinic acid anhydride was fed to the polycondensation reaction, which is an amount of 0.55% in relation to the final polymer.
The polycondensation time was 340 minutes. After breaking the vacuum by nitrogen, the polymer was discharged by pressure and granulated, the intrinsic viscosity of the final polymer product was 1.6 dl/g.

The Comparative Example 1 differs from Example 1 in that no succinic acid is added. More details of Example 1 in particular in comparison with Comparative Example 1 are shown in the following table 1:

Briefly, first an esterification reaction was done with terephthalic acid, then adipic acid was fed together with BDO and it was fed preheated to this preproduct for further reactions. Different molar ratios of butanediol to acid were chosen.

TABLE 1

|  | Comparative Example | Example 1 |
|---|---|---|
| Molar ratio start of esterification BDO:ADA | 1:1.00 | 1:1 |
| Molar ratio start of esterification BDO:PTA | 1:1.40 | 1:1.45 |
| ADA [mol-%] | 52 | 52 |
| PTA [mol-%] | 48 | 48 |
| Pentaerythritol | 0.7 kg/t | 0.7 kg/t |
| Polyethyleneglycol 400 | 13 kg/t | 13 kg/t |
| Catalyst140 ppm Ti | 140 ppm Ti |  |
| Feed of succinic acid anhydride 190 minutes after start of polycondensation | — | 0.55% |
| Polycondensation time [min]330 | 340 |  |
| Final product IV | 1.6 dl/g | 1.6 dl/g |
| Final product COOH | 11 meq/kg | 38 meq/kg |
| THF in pellets product [ppm] | 28 | 16 |
| L (Chips, cryst.) (Cielab) | 67.6 | 76.4 |
| A (Chips, cryst.) (Cielab) | 29.8 | 6.8 |
| B (Chips, cryst.) (Cielab) | 44.4 | 17.7 |

The THF value of the Example 1 was lower than that of Comparative Example 1 indicating a higher thermal degradation.

By adding succinic acid anhydride to the polycondensation a reduction of the OH-end-groups in relation to the —COOH-end-groups has been achieved resulting in a modification of the overall polymer structure. Color values were improved after feeding succinic acid anhydride to the polymer during polycondensation. This may indicate a reduction in color forming side-reactions by adding the additive.

EXAMPLE 2

PBT was mixed with three different additives and then melted and reacted at 250-251° C. for a residence time of 3-3.2 minutes and pelletized.

In the following table 2 the results are shown. It is shown that the OH-end-groups were reduced in comparison to PBT without these additives.

TABLE 2

| No | Additive | Amount of Additive | Analyzed OH-end-groups in polymer product [meq/kg] | Analyzed - COOH-end-group in polymer product [meq/kg] | Difference between OH-end-groups and —COOH-end-groups |
|---|---|---|---|---|---|
| 1 | No additive | 0 | 70 | 24 | 46 |
| 2 | Glutaric acid anhydride | 4 g/kg | 45 | 41 | 4 |
| 3 | Acetic acid anhydride | 3.6 g/kg | 57 | 30 | 27 |
| 4 | Phenylisocyanate | 4.2 g/kg | 44 | 24 | 20 |

The invention claimed is:

1. A process for reducing the amount of hydroxyl-end-groups of a polyester, wherein the polyester is prepared from at least one dicarboxylic acid and at least one dihydroxy alcohol, and at least one additive selected from the group consisting of carboxylic acid anhydride and mono-isocyanate.

2. The process according to claim 1, wherein the additive is added during a step of prepolycondensation and/or during a step of polycondensation and/or after a step of polycondensation.

3. The process according to claim 1, wherein the carboxylic acid anhydride used as additive has the same or a different basic hydrocarbon structure compared to the dicarboxylic acid used as monomer.

4. The process according to claim 1, wherein the carboxylic acid anhydride is selected from the group consisting of glutaric acid anhydride, acetic acid anhydride and succinic acid anhydride.

5. The process according to claim 1, wherein the mono-isocyanate is phenyl-isocyanate.

6. The process according to claim 1, wherein the additive is added in an amount of 0.1 to 10% in relation to the final polyester.

7. The process according to claim 1, wherein the additive is added in an amount of 0.2 to 1.0% in relation to the final polyester.

8. The process according to claim 1, wherein the polyester comprises dicarboxylic acid compounds and diol compounds; and wherein the dicarboxylic acid compounds are
 a) linear dimeric acids having a molecular formula $C_nH_{2(n-1)}O_4$ with n equal to or smaller than 40, and/or
 b) dimeric acids or dicarboxylic acids having a cyclic ring, and/or
 c) esters of the dicarboxylic acids or acid anhydrides of the dicarboxylic acids;
 wherein the dicarboxylic acid compounds comprise a single compound or as mixture of two or more compounds; and wherein the diol compounds are aliphatic or alicyclic compounds having two —OH groups.

9. The process according to claim 8, wherein the esters of the dicarboxylic acids are selected from the group consisting of methyl ester, ethyl ester, propyl ester and butyl ester.

10. The process according to claim 1 wherein the polyester comprises dicarboxylic acid compounds as well as their respective ester wherein the dicarboxylic acid compounds comprise a single compound or as a mixture of two or more compounds; and diol compounds with 2-10 carbon atoms wherein the diol compounds comprise a single compound or as a mixture of two or more compounds.

11. The process according to claim 10, wherein the respective ester is selected from the group consisting of methyl ester, ethyl ester, propyl ester and butyl ester.

12. The process according to claim 8 wherein the linear dimeric acids having a molecular formula $C_nH_{2(n-1)}O_4$ with n equal to or smaller than 40 are selected from the group consisting of oxalic-, malonic-, succinic-, glutaric-, adipinic-, and pimelic-acid.

13. The process according to claim 8 wherein the dicarboxylic acid having a cyclic ring is cyclohexane dicarboxylic acid.

14. The process according to claim 10 wherein the dicarboxylic acid compounds are selected from the group consisting of terephthalic acid, isophthalic acid, 2,6-naphtalenedicarboxylic acid and acids having a furan ring.

15. The process according to claim 14 wherein acid having a furan ring is furan dicarboxylic acid.

16. The process according to claim 10 wherein the diol compounds with 2-10 carbon atoms are selected from the group consisting of ethyleneglycol, 1,3-proanediol, 1,4-butanediol, neopentylglycol, 1,6-hexamethyleneglycol, 1,4-cyclohexanedimethanol, polyglycols based on ethylene glycol or trimethyleneglycol, 1,4-butaneidol, and polytetrahydrofurane (polytetramethylene ether glycols).

* * * * *